Figure 1:
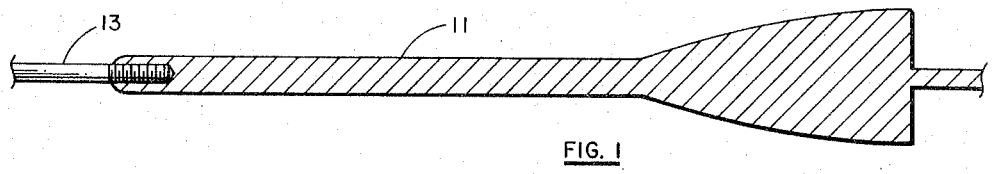

Feb. 7, 1967  E. L. ALEXANDER ETAL  3,302,405
ROCKET MOTOR
Filed Oct. 2, 1963  2 Sheets-Sheet 1

INVENTORS
EARL L. ALEXANDER
BY BASIL H. MINNICH

Stuart W. Wohlgemuth
ATTORNEY

Feb. 7, 1967  E. L. ALEXANDER ETAL  3,302,405
ROCKET MOTOR

Filed Oct. 2, 1963  2 Sheets-Sheet 2

INVENTORS
EARL L. ALEXANDER
BY BASIL H. MINNICH

*Stuart W. Wohlgemuth*
ATTORNEY

United States Patent Office 3,302,405
Patented Feb. 7, 1967

3,302,405
ROCKET MOTOR
Earl L. Alexander, Northridge, and Basil H. Minnich, Simi, Calif., assignors to North American Aviation, Inc.
Filed Oct. 2, 1963, Ser. No. 313,209
2 Claims. (Cl. 60—254)

This invention relates to a novel rocket engine nozzle configuration and method of making same. More particularly, the invention relates to a filament wound ablative nozzle configuration and method of manufacture which is partciularly adaptable to solid propellant rocket motors.

Prior to this invention, the nozzle of a rocket motor although it might in some cases be reinforced with fiberglass wrapping, was generally a cast or machined metal or plastic part. Recently, composite nozzles have been made utilizing pyrolytic graphite, graphitized cloth, refractory metal films on graphite or other refractory nozzle inserts. It should be pointed out that in all applications to date, it has been necessary to provide a highly refractory insert in the throat area, particularly, of the nozzle. This insert will differ in consistency from the remaining material comprising the nozzle. The insert is most often a thick solid structure of graphite, ceramic or refractory material in the desired configurations. In general, ablative materials have not found use in the throat area of the nozzle because they will not maintain desired dimensional stability. These nozzles were always a separate item of hardware and were threadedly secured to the main housing for the rocket engine or brazed thereto. When fiberglass is utilized as the rocket motor casing, the nozzles were secured by locking them to the housing through wrapping fiberglass about portions of the nozzles or other means were employed. These particular pre-cast nozzles are heavyweight and are not always well integrated with the main body of the rocket casing. This, of course, results in both a weight disadvantage for the rocket motor and poor structural stability. Many of the nozzles are provided with flanges which are mated to a flange on the main rocket housing and are bolted thereto.

In addition to the lack of structural integrity due to the separate nozzles utilized, problems result in the cooling of such nozzles. The throat of the nozzle is particularly the hottest part in the engine. Temperatures between 5200 and 6200° F. are reached in the throat nozzle areas from the exhaust gases produced by conventional solid propellant rocket, for example. It is thus necessary that an insulator be utilized between the hot gases and the low heat resistant walls of the nozzle. Methods for providing such an insulator include the utilization of a ceramic liner, special insulating paints, a plastic or rubberlike material bonded or glued to the wall which is allowed to burn away slowly or an ablative material which by fusion and evaporation absorbs heat as it is consumed.

The ablative materials are generally most effective because they provide both an insulating layer and an effluent layer diverts the flow of hot gases, decreases the value of the gas film coefficient and decreases the gas temperatures near the wall. The ablative type materials have generally been applied to the inside of the prefabricated nozzles and are not generally formed integral therewith except in the case of the fiberglass nozzle construction. The fiber reinforced ablatives are among the most widely used materials. Not only can they be used as a nozzle but used as lining to the metal nozzles. Materials such as the phenolics and certain epoxy and silicone resins which form a carbonaceous shell of coke upon heating appear to be the most useful of the types of materials used for ablatives.

Most ablative materials are comprised of a matrix of a thermal setting resin. Examples of these are the heat resistant phenolic and silicone phenolic resins and certain epoxy and silicone resins. Most often the materials are fiber reinforced to give added strength. The fiber can affect the endothermic reactions of the melting and vaporization. Often when the fiber is, for example fiberglass, a viscous protective layer of silica results from the ablative action as the fiberglass melts. In the ablative process heat is slowly absorbed in the poorly conductive ablative composition. The surface temperature of the ablative material rises relatively rapidly causing pyrolysis of the surface material. The endothermic pyrolysis reaction absorbs heat as the ablative material is broken down to form gases of lower molecular weight. These cool gases contribute to a boundary layer of relatively cool stagnant gas which protects parts of the rocket engine from the hotter main stream of combustion gas. The boundary layer decreases but does not eliminate heat flux to the ablative surface. The ablation process continues due to heat penetrating the boundary layer thermal barrier. The efficiency of the boundary layer as a heat barrier thus becomes one of the critical factors influencing ablation rate or the effectiveness of the ablative material as a thermal barrier. With the commonly used matrix materials, the pyrolysis on the surface forms a char layer of coke. When this occurs, the pyrolysis then moves to a lower zone in the ablative material and the resultant gases of the pyrolysis percolate through the char layer undergoing additional thermal cracking as they pass through the char layer. Further pyrolytic carbon is deposited on the walls of the pores in the char layer. During the course of this process, the char layer serves to protect the additional ablative material under it while it remains on the surface for a short period of time. When the organic matrix is pyrolyzed and the residual char is removed by various aspects of the environment, the reinforcing fibers are left exposed to the hot gas stream. This results in a melting of the fibrous material. The molten silica in the case of the fiberglass reinforcing forms a thin film which additionally serves to protect the remaining ablative material. Eventually this molten glass film is vaporized and removed by various forces in the gas streams of the nozzle.

Various problems result from the previously described ablative process. Firstly, problems relate to the formation of the char layer. The char layer is not necessarily evenly formed on the surface and the gas will percolate through it with varying degrees of difficulty. Furthermore, the gas as it percolates through does not necessarily do so in an even manner so that there is not an evenly distributed cooled gas boundary layer. Also with relation to the char layer, the pieces of the char layer may flake off at different times and in differing degrees. This provides for a relatively rough and uneven surface affecting the contour of the nozzle. Furthermore, it affects the degree of cracking of the gases being emitted from the lower matrix layers. Additionally, the type of structure previously described does not evenly distribute the heat throughout the matrix material. Moreover, the pyrolysis gas does not reach as high a temperature as it might within the ablative structure due to the short path from the ablating surface to the char layer. The heat rejected by prolysis gas into the main stream is proportional to the product of its mass flowrate, average specific heat, and temperature rise from the ablative surface to the ablative gas temperature leaving the surface of the ablative structure. For maximum efficiency mass flowrate should be minimized and specific heat and temperature rise should both be maximized.

Thus, it is an object of this invention to provide an ablative composite for smoothly and uniformly introducing a cooled gas boundary layer at the surface thereof.

Another object of this invention is to provide a device and method of fabricating rocket nozzles by filament winding technique which is compatible with the filament winding techniques used to fabricate reinforced solid propellants.

A further object of the invention is to provide a method of making an ablative nozzle in a continuous process in which the solid propellant is made.

Another object of the invention is to provide an ablative heat shield which will use refractive materials in filament form to obtain advantages and reduced weight and inherent enhanced strength of the fibrous form of the refractive material. Other objects will become apparent from the following detailed description.

Figure 2:
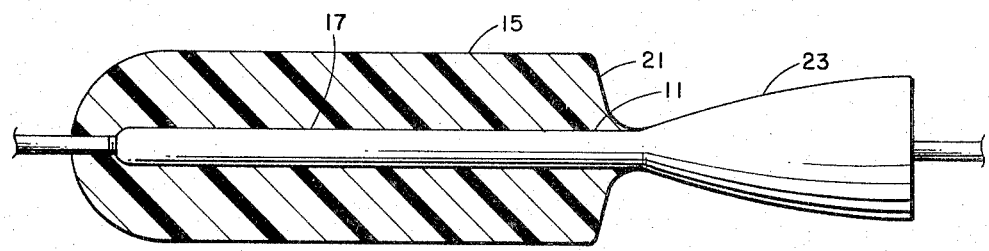
Figure 4:
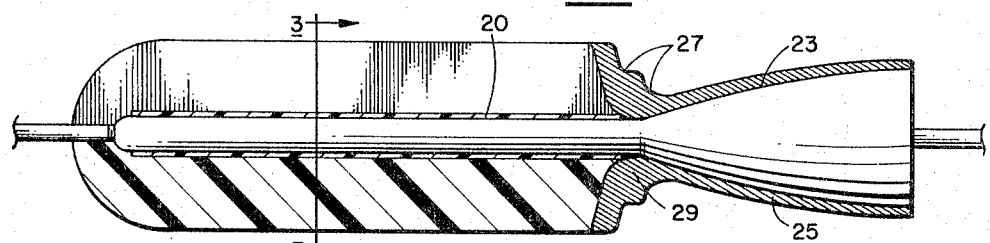
Figure 5:
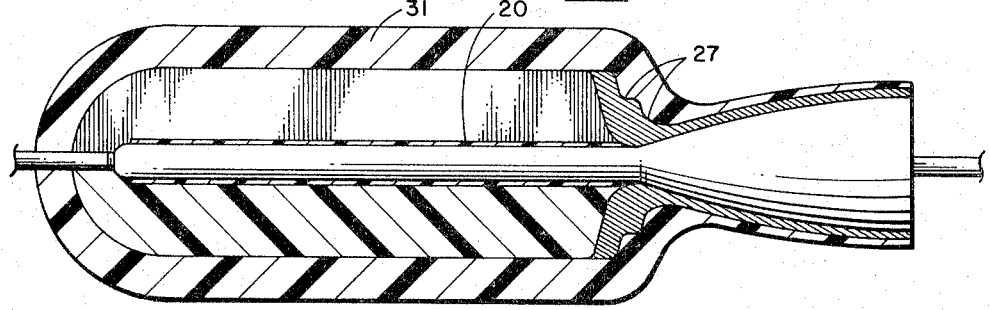
Figure 3:
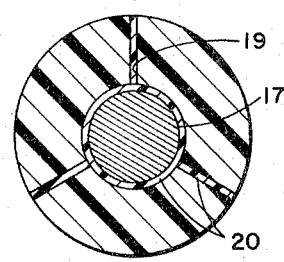
Figure 6:
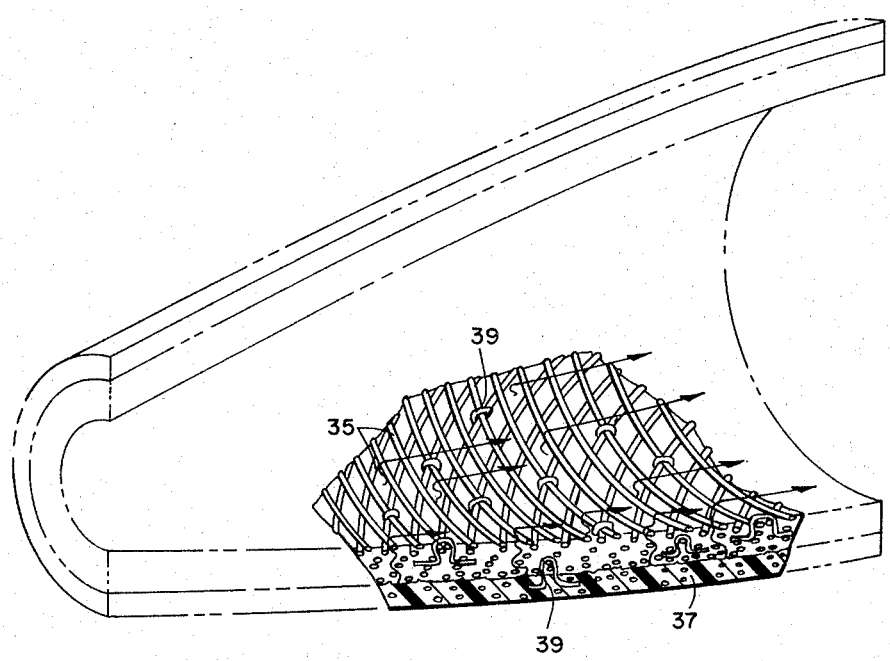

Briefly the invention relates to the forming of an ablative heat shield by utilizing as a reinforcing material filaments of refractory material such as tungsten wire. The wire is wound according to conventional filament winding techniques and while being so wound a matrix of a non-charring polymeric material is utilized to fill the voids between the interstices of refractory wire. Upon burning, the plastic matrix is pyrolyzed breaking the polymer chain down to lower molecular weight compounds. The pyrolysis gases are further cracked to hydrogen and other gases for introduction into the boundary area layer. As a result, the inherent disadvantages of forming a char layer have been eliminated by this construction. In the invention a three dimensional lattice of hot filaments is utilized to crack the pyrolysis gases rather than a char layer. Attention is directed further to the drawings in which:

FIG. 1 is a pictorial view of a mandrel upon which propellant and an ablative nozzle is wound, FIG. 2 is a pictorial view of the mandrel of FIG. 1 with the propellant core thereon, FIG. 3 is a cross-sectional of the core grain taken along line 3—3 of FIG. 4, FIG. 4 is a cross-section pictorial view of the mandrel having the core grain and ablative nozzle thereon, FIG. 5 is a cross-section pictorial view of the nozzle and motor configuration, FIG. 6 is a perspective view of the ablative structure of the invention showing a means for locking the filaments in place.

In FIG. 1 a conventional mandrel is shown upon which the grain and nozzle of the invention can be formed. The mandrel can be of a metal, coated with Teflon if desired providing for easy removal of it from the formed rocket motor. The threaded axle 13 is provided at the forward end of the mandrel aiding in the ultimate removal of the mandrel from the final product. As shown in FIG. 2 a core grain 15 is initially disposed about the main cylindrical portion 17 of the mandrel. This core grain may be pre-cast or prefabricated prior to being placed over the mandrel. However, the core grain can be wound about the mandrel to form a reinforced propellant grain in the manner described in co-pending patent applications Serial Nos. 144,265, filed October 20, 1961 and 179,466, filed March 19, 1962. In the specific example disclosed in the figures, it is preferable that the core grain 15 is reinforced with metallic wires and that it have slots 19 therein as shown in FIG. 3. The slots 19 are cut in the grain of FIG. 2. Melt-out plastic spacers 20 are disposed about the mandrel 17 and in the slots prior to the winding in FIG. 4. The presence of the slots provide for very rapid burning of the core grain as seen in U.S. application Serial No. 240,205, filed November 23, 1962. After the core grain is consumed, the reinforced propellant shell is consumed at a slower rate thus providing a regressive pressure-time characteristic as described in the co-pending application. This will provide for an essentially caseless rocket motor or a rocket motor having a very lightweight casing due to the regressive pressure characteristics of such a slotted reinforced propellant grain. The aft end 21 of the core grain is slightly tapered so as to correspond to the filament wound nozzle that is wound adjacent thereto. The composition of the core grain would, for example, be ammonium perchlorate as a solid particulate oxidizer disposed in a matrix of carboxy-terminated linear polybutadiene utilizing aluminum filaments as the reinforcing wire.

After the core grain is placed upon the mandrel, the ablative nozzle portion is then wound about the nozzle area 23 of the mandrel as particularly shown in FIG. 4. The ablative nozzle 25 will comprise, for example, filament wound tungsten wire with a matrix of a polymeric material such as polymethylmethacrylate which will not char but alternatively breaks down to form low molecular weight compounds upon pyrolysis. The same technique of winding that applies to forming the reinforced core grain 15 is utilized in winding the ablative nozzle 25. The winding technique utilized is that conventionally found in forming a filament reinforced structure. Any additional refractory wire may be used such as beryllium wire, for example.

The wires may be from 3 to 10 mil for small components. Correspondingly larger wires can be used in large motors. The wires can occupy from 2 to 70 percent by volume of the structure. The amount of wire will depend on the region in which it is utilized. For example, it might be desirous to have a higher percentage of wire in the throat area.

About the outer circumference of the filament wound nozzle about the throat area, there is preferably provided a plurality of steps 27. These serve to lock the nozzle to the grain when the outer covering is placed thereupon as will be further described with reference to FIG. 5. In the ablative nozzle area, the refractory metal wire may constitute up to 75 percent of the nozzle. The minimum amount of wire utilized would be five volume percent, with a preferred amount approximating 50 volume percent of the wire. In the throat area 29, the percent of wire can be increased considerably to up to 75 volume percent. This will serve to provide less erosion and maintain structural strength in the hottest region of the nozzle. Alternatively, a ceramic or other type of insert commonly used for rocket nozzle throats may be placed at the throat area with the ablative nozzle wound about this insert.

As shown in FIG. 5, a final outer casing 31 can be wrapped about the core grain and ablative nozzle. The outer casing may comprise a relatively thin layer of fiberglass wrapping or can be of the reinforced propellant material that forms the core grain. When the outer layer 31 is of the reinforced propellant material, the entire rocket motor then becomes a consumable one which is advantageous for certain applications. In affect, the resultant product would be termed a caseless rocket motor since there is no outer metal or fiberglass casing in such an application. As the outer layer 31 is filament wound about the core grain and nozzle, the fibers will wrap around the step configuration 27 at the outer circumference of the throat area of the ablative nozzle and serve to lock or integrate the nozzle to the reinforced propellant grain so that it becomes a part of the overall filament wound pressure vessel that contains the combustion gas.

In the fabrication of the ablative filament wound nozzle of the motor, it may often be preferable to discontinue the filaments in the winding process or alternatively the filaments may be notched periodically in the winding thereof. The reason for discontinuous or notched filaments is that as the ablative plastic matrix is removed, the refractory wire mass might otherwise be unwound from inside the nozzle by drag of the exhaust gas stream. A thicker layer of the refractory wire lattice can be maintained by permitting only short lengths to break away into the exhaust gas. Alternatively, other methods may be used to knit the wire lattice together without support of the polymer matrix.

In addition to the polyformaldehyde polymer indicated as used for the plastic matrix, other polymers would include fluoro-polymers such as Viton which is comprised of several fluoro elastomers; polyacrylates such as polymethylmethacrylate with the exception of acrylonitrile or Orlon which will char upon pyrolysis; polybutadiene; polypropylene; polyethylene and any other polymers which will break down upon pyrolysis to form low molecular weight fragments and not producing any char material. The type plastics that normally form the char materials are those that upon pyrolysis form a plurality of interlocked benzene rings which is the main constituent of the char. This is to be avoided in selecting a plastic for the application of this invention.

When the nozzle or ablative heat shield is formed as shown in the previous figures and as described, the refractory reinforcing filaments will unwind or unravel as the ablative plastic matrix is consumed. As indicated, the wires may be nicked in the process of winding or discontinuous filaments could be used so that the whole mass does not become snarled. When the composition of the invention is used in applications for heat shields other than nozzles, the problem relating to the change of size upon the ablation is not severe. For example, when the material is used as a nose cone, the fact that the filaments will disappear or come off the vehicle as the matrix disappears is not of great moment since the slight change of size of the nose cone will not severely affect the performance of the missile. However, quite often it is fully desirable that the rocket nozzle maintain essentially the original contour. Normally the performance of the rocket is designed around a certain throat nozzle diameter. In order to maintain the contour throughout the burning of the rocket motor, it would be necessary to keep the refractory filaments in place. This can be accomplished by various means, one of which is illustrated in FIG. 6. In FIG. 6 the refractory wires 35 are depicted having the matrix 37 therebetween.

In the winding process, U-shaped tack-like elements 39 may be placed about the circumference of the nozzle. The wire will then pass around the elements 39. The elements are then bent over at their ends so as to key them into the structure as the filament layers are wound to that point. The action of the succeeding layers of wire passing over the elements 39 will serve to bend them as desired due to the fact that the filaments 35 pass at various angles depending on the layers to the U-shaped elements 39, they are rigidly held in place and bonded to the structure. As a result, when a substantial plurality of these elements are present in the structure, the filaments will resist any movement due to the stress placed upon them by the exhaust gases and will be held in place even upon the disappearance of the plastic matrix material. FIG. 6 additionally discloses the arduous path of the pyrolysis gases through the filament lattice to the surface.

Alternative to this particular shown embodiment, the filaments may be held in place by providing them with barbs as they are being wound in a manner similar to the conventional barbwire. The barbs would then cause an interlocking action between the adjacent filaments and would prevent them from unraveling due to disappearance of the plastic matrix. A further embodiment would be to pre-wind the nozzle without any matrix material and then electrically fuse the filaments together at the contact points. After this the solidified structure could be impregnated with a melted plastic matrix or a matrix of material that would be liquid in a normal state and cure to a solid plastic upon application of heat.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A solid propellant rocket motor comprising:
   a wire reinforced solid propellant core grain,
   a nozzle adjacent the aft end of said core grain, said nozzle comprising:
      a filament wound structure of refractory metal wire,
      and a matrix of a non-charring plastic disposed within said filament structure, wherein the filaments are discontinuous throughout said matrix,
      and an outer filament wound casing enclosing said core grain and nozzle.
2. A solid propellant rocket motor comprising:
   a wire reinforced solid propellant core grain,
   a nozzle adjacent the aft end of said core grain, said nozzle comprising:
      a filament wound structure of refractory metal wire wherein the filaments are secured to each other,
      and a matrix of a non-charring plastic disposed within said filament structure,
      and an outer filament wound casing enclosing said core grain and nozzle.

References Cited by the Examiner

UNITED STATES PATENTS

| | | | |
|---|---|---|---|
| 3,017,746 | 1/1962 | Kiphart | 60—35.6 |
| 3,032,970 | 5/1962 | Fox | 60—35.6 |
| 3,152,548 | 10/1964 | Schwartz | 102—92.5 |
| 3,176,618 | 4/1965 | Forsberg et al. | 60—35.6 |

CARLTON R. CROYLE, *Primary Examiner.*

SAMUEL FEINBERG, *Examiner.*